(12) United States Patent
Mays

(10) Patent No.: US 9,249,972 B2
(45) Date of Patent: Feb. 2, 2016

(54) STEAM GENERATOR AND METHOD FOR GENERATING STEAM

(71) Applicant: Gas Technology Institute, Des Plaines, IL (US)

(72) Inventor: Jeffrey A. Mays, Canoga Park, CA (US)

(73) Assignee: Gas Technology Institute, Des Plaines, IL (US)

( * ) Notice: Subject to any disclaimer, the term of this patent is extended or adjusted under 35 U.S.C. 154(b) by 305 days.

(21) Appl. No.: 13/733,988

(22) Filed: Jan. 4, 2013

(65) Prior Publication Data

US 2014/0190698 A1    Jul. 10, 2014

(51) Int. Cl.
| | |
|---|---|
| E21B 43/24 | (2006.01) |
| F22B 1/02 | (2006.01) |
| F22B 37/00 | (2006.01) |
| F22B 1/18 | (2006.01) |

(52) U.S. Cl.
CPC . *F22B 1/02* (2013.01); *E21B 43/24* (2013.01); *F22B 1/1853* (2013.01); *F22B 37/00* (2013.01)

(58) Field of Classification Search
CPC ..... E21B 43/24; E21B 43/16; E21B 43/2406; F22B 1/003; F22B 1/02; F22B 1/1853; F22B 37/00
See application file for complete search history.

(56) References Cited

U.S. PATENT DOCUMENTS

| | | |
|---|---|---|
| 3,982,591 A | 9/1976 | Hamrick et al. |
| 3,982,592 A | 9/1976 | Hamrick et al. |
| 4,050,515 A | 9/1977 | Hamrick et al. |
| 4,053,015 A | 10/1977 | Hamrick et al. |
| 4,077,469 A | 3/1978 | Hamrick et al. |
| 4,078,613 A | 3/1978 | Hamrick et al. |
| 4,159,743 A | 7/1979 | Rose et al. |
| 4,199,024 A | 4/1980 | Rose et al. |
| 4,385,661 A | 5/1983 | Fox |
| 4,411,618 A | 10/1983 | Donaldson et al. |
| 4,558,743 A | 12/1985 | Ryan et al. |
| 4,597,441 A | 7/1986 | Ware et al. |
| 4,604,988 A | 8/1986 | Rao |
| 4,687,491 A | 8/1987 | Latty |
| 4,930,454 A | 6/1990 | Latty et al. |
| 5,163,511 A | 11/1992 | Amundson et al. |
| 5,404,952 A | 4/1995 | Vinegar et al. |
| 6,016,867 A | 1/2000 | Gregoli et al. |
| 6,016,868 A | 1/2000 | Gregoli et al. |

(Continued)

FOREIGN PATENT DOCUMENTS

| | | |
|---|---|---|
| CA | 2 754 358 | 9/2010 |
| WO | 2008143745 | 11/2008 |

OTHER PUBLICATIONS

U.S. Appl. No. 13/407,273, filed Feb. 28, 2012, entitled Combustor Assembly and Method Therefor.

(Continued)

*Primary Examiner* — Yong-Suk (Philip) Ro
(74) *Attorney, Agent, or Firm* — Pauley Erickson & Kottis

(57) ABSTRACT

A method for producing steam includes combusting a fuel and an oxidant to generate heat in a combustion stream, and injecting impure water into the combustion stream such that the heat produces a steam stream including particulate matter precipitated from the impure water. A steam generator includes a combustion chamber that has an initial section including an oxidant feed that is substantially free of nitrogen and a fuel feed, and downstream from the initial section at least one liquid water feed.

11 Claims, 1 Drawing Sheet

(56) References Cited

U.S. PATENT DOCUMENTS

| | | |
|---|---|---|
| 6,328,104 B1 | 12/2001 | Graue |
| 6,924,608 B2 | 8/2005 | Czernichowski et al. |
| 6,989,091 B2 | 1/2006 | Jorgensen |
| 6,990,422 B2 | 1/2006 | Laletin et al. |
| 7,100,543 B2 | 9/2006 | Davidson |
| 7,138,046 B2 | 11/2006 | Roychowdhury |
| 7,377,272 B2 | 5/2008 | Davidson |
| 7,712,528 B2 | 5/2010 | Langdon et al. |
| 7,770,646 B2 | 8/2010 | Klassen et al. |
| 7,780,152 B2 | 8/2010 | Rao |
| 7,967,965 B2 | 6/2011 | Jones |
| 8,091,625 B2 | 1/2012 | Ware et al. |
| 8,091,636 B2 | 1/2012 | Kuhlman |
| 8,286,698 B2 | 10/2012 | Ware et al. |
| 8,613,316 B2 * | 12/2013 | Castrogiovanni et al. .... 166/261 |
| 2009/0211539 A1 * | 8/2009 | Tsilevich .................. 122/11 |
| 2010/0037835 A1 * | 2/2010 | Betzer Tsilevich ............. 122/11 |
| 2011/0036308 A1 * | 2/2011 | Betzer-Zilevitch .......... 122/5.52 |
| 2011/0127036 A1 | 6/2011 | Tilmont et al. |
| 2011/0214858 A1 | 9/2011 | Castrogiovanni et al. |
| 2012/0160187 A1 * | 6/2012 | Bunio et al. ................. 122/31.1 |

OTHER PUBLICATIONS

U.S. Appl. No. 13/448,293, filed Apr. 16, 2012, entitled Steam Generator Film Cooling Using Produced Water.

* cited by examiner

STEAM GENERATOR AND METHOD FOR GENERATING STEAM

BACKGROUND

This disclosure relates to combustion steam generation.

Steam can be used for a variety of purposes, such as hydrocarbon extraction and power generation. In hydrocarbon extraction, high pressure steam is used for thermal stimulation of a hydrocarbon reservoir and to drive the hydrocarbon out. Typically, steam is produced using a boiler or burner assembly.

SUMMARY

A method for producing steam according to an aspect of the disclosure includes combusting a fuel and an oxidant to generate heat in a combustion stream, and injecting impure water into the combustion stream such that the heat produces a steam stream, which includes particulate matter precipitated from the impure water.

In a further non-limiting embodiment of any of the foregoing examples, the combusting is conducted in a combustion chamber, and further includes preventing a scale build-up of the particulate matter on interior surfaces of the combustion chamber.

In a further non-limiting embodiment of any of the foregoing examples, the combusting includes establishing a velocity of the combustion stream that is greater than a saltation velocity of the particulate matter in the combustion stream.

In a further non-limiting embodiment of any of the foregoing examples, the combusting is conducted in a combustion chamber, and further includes cooling the combustion chamber using a film of the impure water.

In a further non-limiting embodiment of any of the foregoing examples, the impure water produces water.

A further non-limiting embodiment of any of the foregoing examples includes injecting the steam stream into a subterranean hydrocarbon reservoir.

A further non-limiting embodiment of any of the foregoing examples includes injecting the steam stream into the subterranean hydrocarbon reservoir without conveying the steam stream through a heat exchanger.

In a further non-limiting embodiment of any of the foregoing examples, the oxidant is substantially free of nitrogen.

A further non-limiting embodiment of any of the foregoing examples includes heating the impure water into superheated steam.

A further non-limiting embodiment of any of the foregoing examples includes injecting the impure water at a plurality of different downstream positions into the combustion stream.

A further non-limiting embodiment of any of the foregoing examples includes removing the particulate matter from the steam stream.

In a further non-limiting embodiment of any of the foregoing examples, the fuel includes a hydrocarbon.

In a further non-limiting embodiment of any of the foregoing examples, the fuel includes methane.

A steam generator according to an aspect of the present disclosure includes a combustion chamber that has an initial section which includes an oxidant feed and a fuel feed, and downstream from the initial section, at least one impure water feed.

A further non-limiting embodiment of any of the foregoing examples includes a conduit which connects an outlet of the combustion chamber to a subterranean hydrocarbon reservoir and the conduit is free of any heat exchangers.

In a further non-limiting embodiment of any of the foregoing examples, the conduit includes a separator operable to remove particulate matter.

In a further non-limiting embodiment of any of the foregoing examples, the separator is selected from the group consists of a cyclone separator, a filter and combinations thereof.

In a further non-limiting embodiment of any of the foregoing examples, the oxidant feed is an exclusive oxidant feed of the combustion chamber and the fuel feed is an exclusive fuel feed of the combustion chamber.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
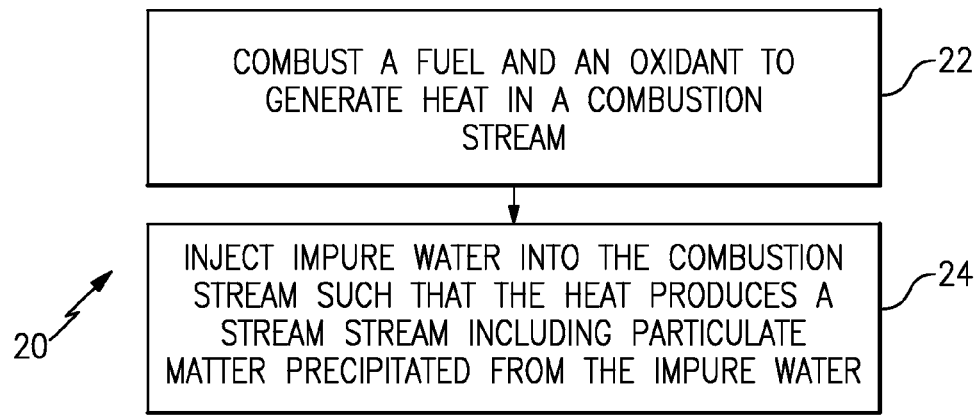
FIG. 1 illustrates an example method for steam generation.
Figure 2:
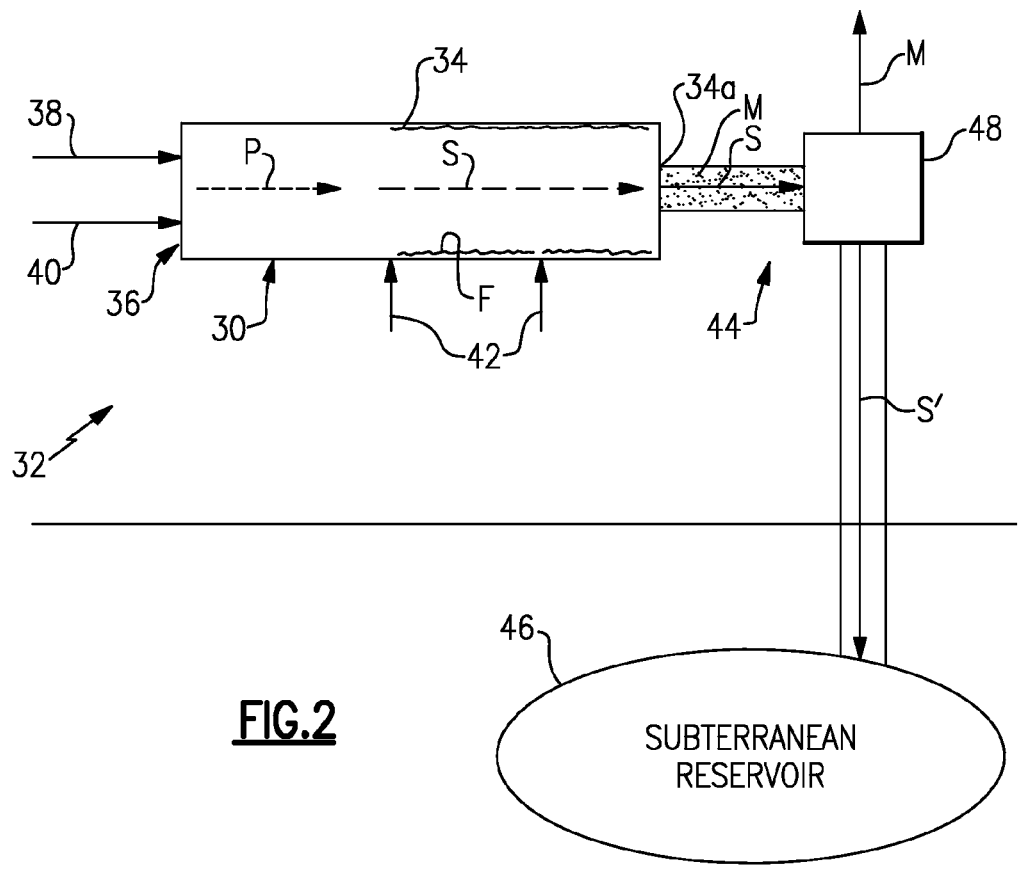
FIG. 2 illustrates a steam generator in an example oil recovery system.

FIG. 1 illustrates an example method 20 for steam generation. As will also be described, FIG. 2 shows an example steam generator 30 in a hydrocarbon recovery system. Thermal stimulation, also known as Enhanced Oil Recovery ("EOR"), of hydrocarbon reservoirs has been used to extract hydrocarbons that may otherwise be inaccessible or difficult to extract. Thermal stimulation involves providing high pressure steam into the reservoir to facilitate hydrocarbon recovery. For instance, heavy crude oil can be too viscous to extract by natural flow. The high pressure steam reduces the viscosity and thereby facilitates recovery. Steam can also be used for additional or other purposes, such as power generation. The method 20 and steam generator 30 can therefore be used for EOR, power generation or other purposes.

Steam can be produced using a boiler or burner assembly. In particular, a burner assembly can combust fuel and air in the presence of water to generate steam. Burner assemblies, such as once-through steam generators, require clean water input. Impure or unclean water, such as hard water or produced water from a hydrocarbon recovery system, forms solid deposits that can cause fouling and damage to the components and plumbing of a system. A water treatment system is therefore required to purify the water that is input, which requires substantial space, capital cost and energy consumption. Additionally, the air used for combustion includes a relatively high concentration of nitrogen, which is a non-condensable gas that can debit hydrocarbon recovery. In these regards, as will be described in more detail below, the example method 20 and steam generator 30 use impure water, which is less expensive than treating water or using treated water. Further, an oxidant (method 20) and an oxidant feed (steam generator 30) that are substantially free of nitrogen can be used to enhance hydrocarbon recovery.

Turning first to FIG. 1, the method 20 includes a combustion step 22 and an injection step 24. At the combustion step 22, fuel and oxidant are combusted to generate heat in a combustion stream. As an example, the fuel is a hydrocarbon, such as methane. The oxidant can be air. In one alternative, the oxidant is pure or substantially pure oxygen that is free of nitrogen.

At the injection step 24, impure water is injected into the combustion stream such that the heat produces a steam stream. For example, the heat in the combustion stream vaporizes impure liquid water to produce the steam stream. The impure or unclean water is water that has impurities, such as mineral deposits. For example, the impure water can be hard water, water that is harder than hard water and/or produced water that is the product of a hydrocarbon recovery system. Produced water is water that has been separated from oil and can have higher hardness than treated water or hard water. In one further example, the impure water is water that has impurities and has not been treated to remove the impurities.

The impurities in the impure water precipitate when the impure water is heated in the combustion stream. The precipitates form solid particulate matter in the steam stream. In one example, the combustion step 22 is conducted in a combustion chamber and the method 20 includes preventing a scale build-up of the particulate matter on interior surfaces of the combustion chamber. For example, the combusting is controlled to establish a velocity of the combustion stream that is greater than a saltation velocity of the particulate matter in the combustion stream. Thus, the particulate matter is entrained in the steam stream and does not build-up on the combustion chamber. Additionally, the impure water can be used to cool the combustion chamber by providing the impure water as a film onto the interior surfaces. Upon eventually vaporization of the film, particulate matter that forms can be carried away by the steam stream at a velocity above the saltation velocity.

The stoichiometric amounts of fuel, oxygen and impure water can be controlled to produce a velocity above the saltation velocity. In a further example, the velocity that is above the saltation velocity is provided by heating the impure water into superheated steam. The stoichiometric amounts of fuel, oxygen and impure water can be controlled such that the impure water vaporizes and is heated into superheated steam. A separator can be provided downstream from the combustion to separate the particulate matter from the steam stream prior to further use of the steam.

In an EOR, the steam stream is injected into a subterranean hydrocarbon reservoir. For example, the steam stream can be conveyed through suitable piping to the reservoir. The solid particulate matter can be fully or partially removed from the steam stream prior to injection into the subterranean hydrocarbon reservoir. Hydrocarbons from the reservoir can then be extracted and recovered in a known manner.

In a further example, and as will also be described with reference to the steam generator 30, the steam stream can be provided into the subterranean hydrocarbon reservoir without running the steam stream through a heat exchanger, such as a boiler. Thus, all of the heat contained in the steam stream is maintained, aside from natural losses, rather than using a portion of the heat to heat another fluid in a heat exchanger.

FIG. 2 shows the steam generator 30. In this example, the steam generator 30 is in an EOR 32, although it is not limited to such applications. The steam generator 30 includes a combustion chamber 34 that has an initial section 36. The initial section 36 includes an oxidant feed 38 and a fuel feed 40. The oxidant feed 38 can be substantially free of nitrogen. The oxidant feed 38 and the fuel feed 40 are understood to be physical structures that include piping or conduits and supply sources including, respectively, the fuel and the oxygen. In this example, the oxidant feed 38 is the exclusive oxidant feed of the combustion chamber 34 and the fuel feed 40 is the exclusive fuel feed of the combustion chamber 34. Thus, there are no additional oxidant feeds and the fuel feeds downstream from the initial section 36 and all of the fuel and oxygen are provided into the combustion chamber 34 at the initial section 36.

At least one impure water feed 42 is located downstream from the initial section 36. Similar to the oxidant feed 38 and the fuel feed 40, the impure water feed 42 is understood to be a physical structure that includes piping or conduits and at least one supply source including impure water. In this example, two impure water feeds 42 are shown, although a single impure water feed 42 or additional impure water feeds 42 could be used, depending on the designed stoichiometry of the steam generator 30.

In this example, the EOR 32 also includes a pipe or conduit 44 that connects an outlet 34a of the combustion chamber 34 to a subterranean hydrocarbon reservoir 46. The conduit 44 is free of any heat exchangers, and thus all the heat in the steam stream S provided from the combustion chamber 34 is maintained, aside from natural losses, rather than using a portion of the heat to heat another fluid in a heat exchanger.

As indicated above, the steam stream S can include particulate matter M that forms from impurities in the impure water provided. In this regard, the conduit 44 can also include a separator 48 that is operable to fully or partially remove the particulate matter. For example, the separator 48 can include a cyclone separator, filter or combination thereof.

A portion of the injected impure water can also serve to cool the combustion chamber 34. As an example, the impure water provides a water film F along the interior surfaces of the combustion chamber to cool the combustion chamber 34. In a further example, the water film is as described and in co-pending application Ser. No. 13/448,293, entitled STEAM GENERATOR FILM COOLING USING PRODUCED WATER.

In operation of the EOR 32, oxidant is provided from the oxidant feed 38 and fuel, such as methane, is provided from the fuel feed 40 into the combustion chamber 34. The combustion of the oxygen and the fuel produces product stream P in the combustion chamber 34. Upon injection of impure water from the liquid water feed(s) 42, the water vaporizes into a superheated state to produce the steam stream S having a velocity above the saltation velocity of the particulate matter M. Any particulate matter M that forms is thus entrained in the steam stream S. The superheating therefore serves to keep the combustion chamber clean and relatively free of particulate matter M, which enhances the life of the combustion chamber 34 and eliminates or reduces the need to purify the impure water prior to injection.

The steam stream S, along with any particulate matter M that is produced, is discharged through the outlet 34a of the combustion chamber 34 into the conduit 44. If the separator 48 is used, the steam stream S and entrained particulate matter M are conveyed into the separator 48 to remove at least a portion of the particulate matter M. The clean steam stream S' continues on and is provided into the subterranean hydrocarbon reservoir 46 for hydrocarbon recovery. Additionally or alternatively, the steam can be used for power generation or other purposes.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for producing steam, the method comprising:
   combusting a fuel and an oxidant to generate heat in a combustion stream;
   injecting impure water into the combustion stream such that the heat produces a steam stream including particulate matter precipitated from the impure water, wherein the combusting is conducted in a combustion chamber, and further including cooling the combusting chamber using a film of the impure water;
   establishing a velocity of the combustion stream that is greater than a saltation velocity of the particulate matter in the combustion stream;
   separating the particulate matter using a separator selected from the group consisting of a cyclone separator, a filter and combinations thereof; and
   injecting the steam stream into a subterranean hydrocarbon reservoir, without conveying the steam stream through a heat exchanger.

2. The method as recited in claim 1, wherein the combusting is conducted in a combustion chamber, and further including preventing a scale build-up of the particulate matter on interior surfaces of the combustion chamber.

3. The method as recited in claim 1, wherein the impure water is produced water.

4. The method as recited in claim 1, wherein the oxidant is substantially free of nitrogen.

5. The method as recited in claim 1, including heating the impure water into superheated steam.

6. The method as recited in claim 1, including injecting the impure water at a plurality of different downstream positions into the combustion stream.

7. The method as recited in claim 1, further including removing the particulate matter from the steam stream.

8. The method as recited in claim 1, wherein the fuel includes a hydrocarbon.

9. The method as recited in claim 1, wherein the fuel includes methane.

10. A steam generator comprising:
    a combustion chamber having an initial section including an oxidant feed and a fuel feed, and downstream from the initial section, at least one impure water feed, wherein the combustion chamber establishes a velocity of a combustion stream that is greater than a saltation velocity of particulate matter in the combustion stream;
    a conduit connecting the outlet of the combustion chamber to a subterranean hydrocarbon reservoir, the conduit being free of any heat exchangers; and
    a separator operable to remove particulate matter positioned with respect to the conduit, wherein the separator is selected from the group consisting of a cyclone separator, a filter and combinations thereof.

11. The steam generator as recited in claim 10, where the oxidant feed is an exclusive oxidant feed of the combustion chamber and the fuel feed is an exclusive fuel feed of the combustion chamber.

* * * * *